(12) United States Patent
Gerig et al.

(10) Patent No.: US 7,360,505 B2
(45) Date of Patent: Apr. 22, 2008

(54) RISING STIMULATION MODIFICATION

(75) Inventors: Duane A. Gerig, Fort Wayne, IN (US);
Curtis McLay, Fort Wayne, IN (US);
John J. Brynda, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

(21) Appl. No.: 11/611,211

(22) Filed: Dec. 15, 2006

(65) Prior Publication Data

US 2007/0101949 A1    May 10, 2007

Related U.S. Application Data

(62) Division of application No. 10/840,185, filed on May 6, 2004, now Pat. No. 7,174,855.

(51) Int. Cl.
*A01K 15/00* (2006.01)

(52) U.S. Cl. .................. 119/718; 119/719; 119/908; 340/573.3

(58) Field of Classification Search ............ 119/718, 119/719, 720, 721, 712, 859, 908, 905; 340/573.2, 340/573.3, 573.4
See application file for complete search history.

(56) References Cited

U.S. PATENT DOCUMENTS

| | | | |
|---|---|---|---|
| 4,335,682 A | 6/1982 | Gonda et al. ................ | 119/29 |
| 4,898,120 A | 2/1990 | Brose ......................... | 119/29 |
| 4,947,795 A | 8/1990 | Farkas ........................ | 119/29 |
| 5,067,441 A | 11/1991 | Weinstein ................... | 119/29 |
| 5,425,330 A | 6/1995 | Touchton et al. ........... | 119/721 |
| 5,666,908 A | 9/1997 | So .............................. | 119/720 |
| 5,799,618 A | 9/1998 | Van Curen et al. ......... | 119/721 |
| 5,815,077 A | 9/1998 | Christiansen ............... | 340/573 |
| 6,058,889 A | 5/2000 | Van Curen et al. ......... | 119/721 |
| 6,073,589 A | 6/2000 | Curen et al. ................ | 119/720 |
| 6,079,367 A | 6/2000 | Stapelfeld et al. .......... | 119/720 |
| 6,095,092 A | 8/2000 | Chou .......................... | 119/721 |
| 6,163,261 A | 12/2000 | Westrick .................... | 340/573.3 |
| 6,166,643 A | 12/2000 | Janning et al. ............. | 340/573.3 |
| 6,263,836 B1 | 7/2001 | Hollis ......................... | 119/712 |
| 6,327,999 B1 | 12/2001 | Gerig ......................... | 119/712 |
| 6,360,697 B1 | 3/2002 | Williams .................... | 119/720 |
| 6,431,122 B1 | 8/2002 | Westrick et al. ............ | 119/721 |
| 6,487,992 B1 | 12/2002 | Hollis ......................... | 119/712 |
| 6,575,120 B1 | 6/2003 | Stapelfeld et al. .......... | 119/720 |
| 6,598,563 B2 | 7/2003 | Kim et al. ................... | 119/720 |
| 6,637,376 B2 | 10/2003 | Lee, IV ...................... | 119/719 |
| 6,668,760 B2 | 12/2003 | Groh et al. .................. | 119/718 |
| 6,684,820 B1 | 2/2004 | Davis .......................... | 119/721 |
| 6,825,768 B2 | 11/2004 | Stapelfeld et al. .......... | 340/573.3 |
| 6,830,013 B2 | 12/2004 | Williams .................... | 119/765 |
| 6,860,240 B2 * | 3/2005 | Kim et al. .................. | 119/719 |
| 6,901,883 B2 * | 6/2005 | Gillis et al. ................ | 119/712 |

(Continued)

*Primary Examiner*—Yvonne R. Abbott
(74) *Attorney, Agent, or Firm*—Pitts & Brittian, PC

(57) ABSTRACT

An animal behavior modification apparatus including a stimulation device for applying a stimulation having a current stimulation level associated with one of a plurality of stimulation levels including a minimum level. The stimulation device including control logic for applying a stimulation, based upon the steps of increasing the current stimulation level; applying a stimulation corresponding to the current stimulation level; determining the behavior of the animal until compliant behavior is obtained; and reducing the current stimulation level between the current stimulation level and the minimum level dependant upon the determining step.

13 Claims, 5 Drawing Sheets

U.S. PATENT DOCUMENTS

| | | | |
|---|---|---|---|
| 6,923,147 B1 | 8/2005 | Davis | 119/721 |
| 6,928,958 B2 | 8/2005 | Crist et al. | 119/718 |
| 6,944,421 B2 | 9/2005 | Axelrod | 434/317 |
| 7,000,570 B2 | 2/2006 | Napolez et al. | 119/718 |

* cited by examiner

RISING STIMULATION MODIFICATION

CROSS REFERENCE TO RELATED APPLICATIONS

This is a division of U.S. patent application Ser. No. 10/840,185, entitled "RISING STIMULATION MODIFICATION", filed May 6, 2004 now U.S. Pat. No. 7,174,855.

BACKGROUND OF THE INVENTION

1. Field of the Invention

The present invention relates to a method and apparatus for modifying the behavior of animals, and, more particularly, to a rising stimulation method of obtaining animal behavioral compliance.

2. Description of the Related Art

An animal behavior modification system, such as an electrical training system, no-bark collar or containment system typically includes a collar-mounted receiver worn by the animal and a wireless transmitter. The wireless transmitter may include a radio frequency transmitter having a wire loop transmitting a radio frequency signal. The wire loop antenna may define the boundary in which the animal is to be confined. The animal wears the receiving unit attached to its collar. When the animal gets within a predetermined distance of the wire loop antenna, the receiver unit detects the radio frequency signal transmitted from the loop antenna, whereupon a correcting stimulus, such as a good tone/bad tone, electrical stimulation, vibration, citronella spray, etc., is administered to the animal.

The receiver unit, which may apply an electrical stimulation to the animal, typically includes a pair of electrode probes, which extend from the receiver unit, through the collar and contact the skin of the animal. An electrical potential is applied between the electrode probes resulting in electrical current flowing through the skin of the animal to thereby apply an electrical stimulation to the animal.

Animal training systems may also include a handheld transmitter allowing an operator to interact with the animal to ensure compliance with verbal or other instructions. The system may also be self-contained such as a no-bark collar that detects behavior and applies a stimulation to the animal The stimulation applied to an animal, as it approaches a boundary, barks or displays other undesirable behavior, is increased to a level of compliance. When the animal is compliant the stimulation level reverts to an initial value.

What is needed in the art is a method of applying stimulation to an animal to obtain a more rapid compliance by the animal.

SUMMARY OF THE INVENTION

The present invention provides a method of controlling a stimulation level to obtain more rapid compliance by the animal.

The invention comprises, in one form thereof, a method of modifying the behavior of an animal including the steps of increasing a stimulation level of a stimulation device in stimulating contact with the animal, the stimulation level associated with one of a plurality of levels, the plurality of levels including a minimum level, applying a stimulation to the animal associated with the stimulation level, determining a compliant behavior of the animal and reducing the stimulation level to one of the plurality of levels between a current stimulation level and the minimum level dependent upon the determining step.

An advantage of the present invention is that the method quickly delivers an effective stimulation to the animal.

Another advantage of the present invention is that levels of stimulation, which prove insufficient to obtain compliant behavior, are not utilized.

A further advantage of the present invention is that battery life of the stimulation device is prolonged since ineffective stimulation levels are obviated.

Yet another advantage of the present invention is that the stimulation level applied to the animal is reduced when the animal quickly responds.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
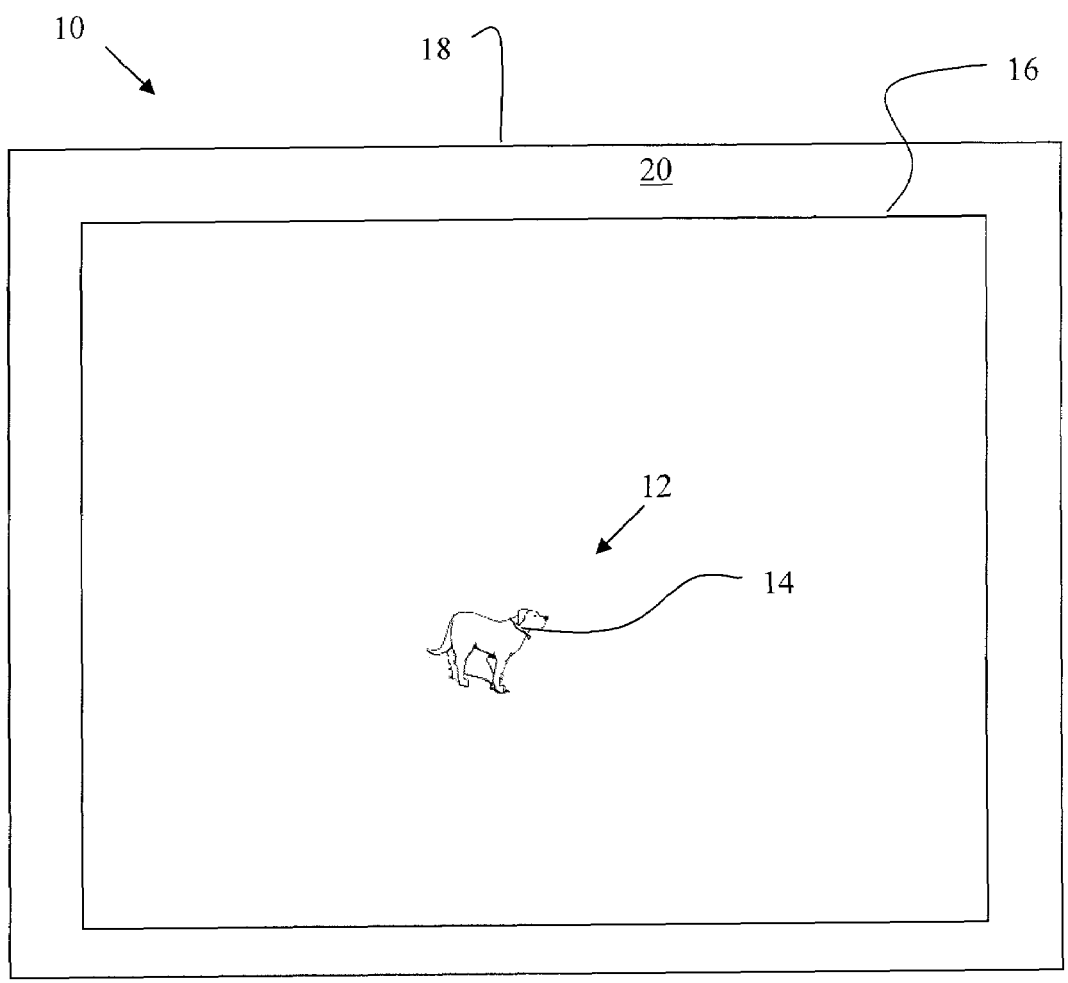
FIG. 1 is a schematic view of one embodiment of the apparatus that utilizes the method of the present invention.

Referring now to the drawings, and more particularly to FIG. 1, there is shown an embodiment of a confinement system 10, which utilizes an embodiment of a method of the present invention of rising stimulation. Confinement system 10 is illustrated with an animal 12 wearing a receiver collar 14 that uses information it receives to confine animal 12 within inner-boundary 16. Receiver collar 14, also known as a stimulation device 14, utilizes the information to determine if animal 12 should receive one or more stimulations from receiver collar 14. Inner-boundary 16 and outer-boundary 18 are used to define enforcement zone 20 therebetween. When animal 12 crosses inner-boundary 16, stimulation device 14 is activated, providing a stimulus to animal 12, thereby providing an incentive for animal 12 to not cross into or through enforcement zone 20 and to stay within inner-boundary 16.

Figure 2:
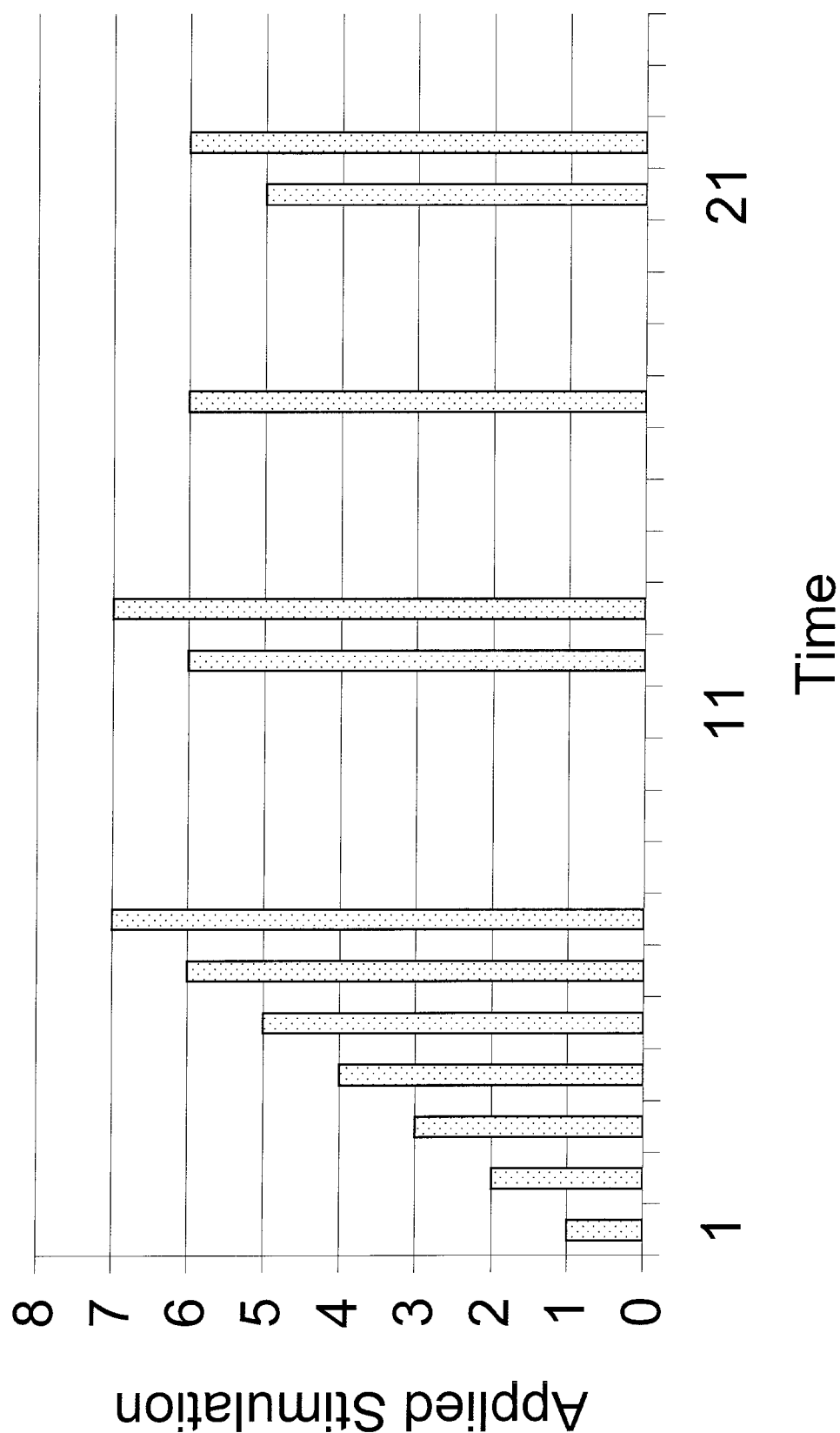
FIG. 2 illustrates applied stimulations to the animal based upon non-compliant behavior of the animal of FIG. 1.
Figure 3:
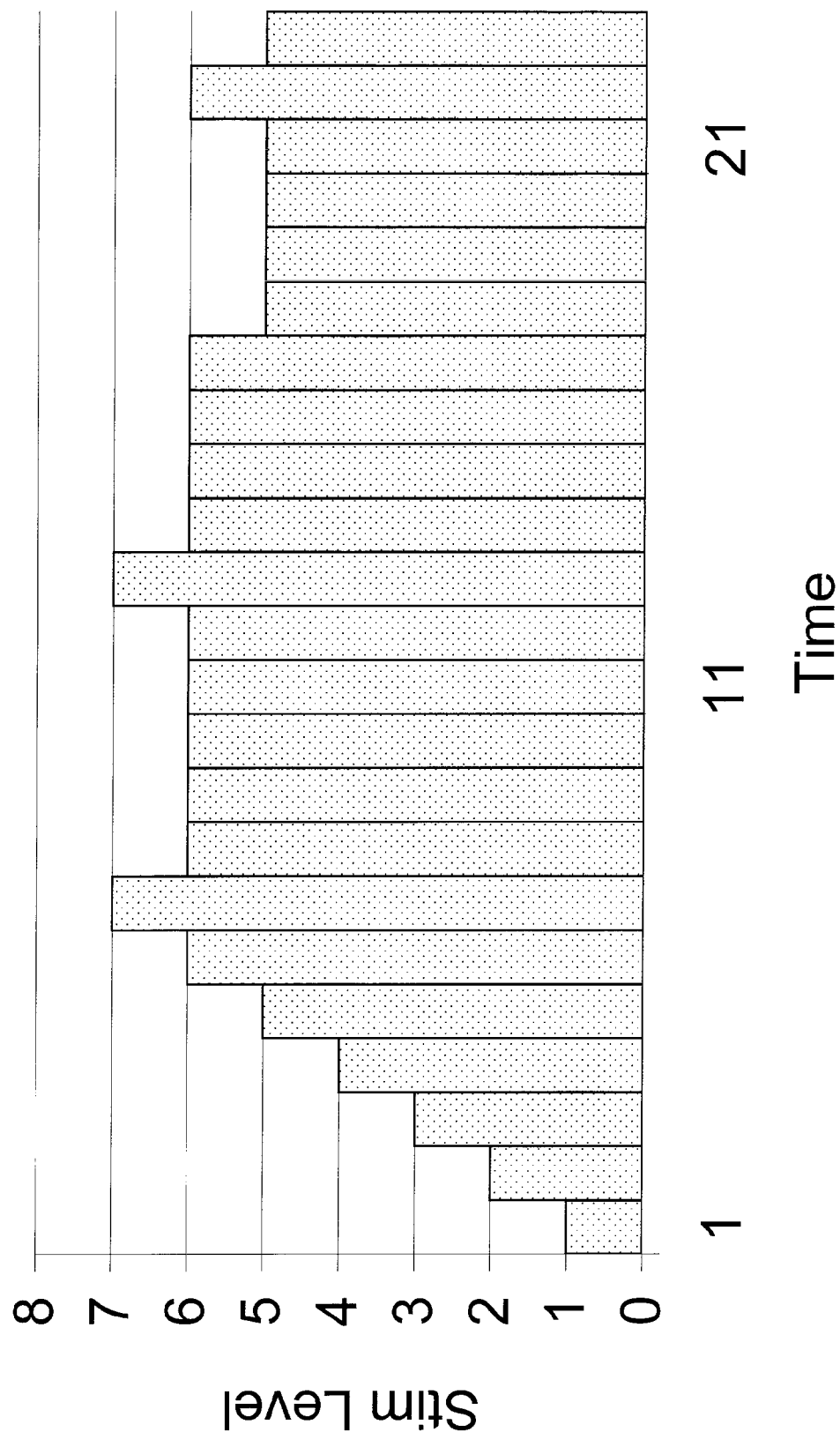
FIG. 3 illustrates the calculated stimulation level as applied by the present invention of FIG. 1.

Now, additionally referring to FIGS. 2 and 3, when animal 12 crosses inner-boundary 16 an initial stimulation is applied by stimulation device 14. As long as animal 12 stays within enforcement zone 20, the stimulation level is increased as shown in time periods 1-7. The rise in stimulation occurs over a relatively short period of time during which an evaluation is ongoing to determine whether animal 12 is still in enforcement zone 20. When animal 12 retreats within inner-boundary 16, the applied stimulation is terminated as shown in time periods 8-11 in FIG. 2. If animal 12 enters enforcement zone 20 at some later period of time, for example, at time periods 12, 13, 17, 21 and 22 as illustrated in FIG. 2, then a stimulation is applied during these time periods. The stimulation level utilized, in this example, to enforce compliance with animal 12, during time period 12 is one increment less than the maximum applied in the previous stimulation, time period 7. At time period 12 non-compliance is again detected and the current stimulation level is applied, since the response was not immediate the stimulation level at time period 13 is elevated. In a like manner at time period 17, stimulation is applied at level 6, which is one incremental level lower than the previous applied stimulation at time period 13. Since animal 12 responded immediately at time period 17, no additional stimulations were applied during time period 18. Then in accordance with the present invention, the stimulation level is lowered to level 5 as illustrated in FIG. 3. At time period 21, animal 12 again violates enforcement zone 20 and stimulation is applied at level 5, corresponding to the stimulation level as shown in FIG. 3. Again, animal 12 delays compliance until a second time period and the applied stimulation is increased by one level at time period 22.

Although, the embodiment discussed above is directed to a confinement system, the modification of other types of behavior, such as barking, are also subject to modification by the present invention.

Advantageously, the present invention adjusts the stimulation level to be responsive to the sensitivity of animal 12. As long as animal 12 quickly responds to the stimulation, the stimulation level is adjusted accordingly.

If animal 12 should go beyond outer-boundary 18, receiver collar 14 is deactivated until animal 12 is again within inner-boundary 16. This eliminates punishment to animal 12 when animal 12 is beyond outer-boundary 18 and when animal 12 re-enters the desired area defined by inner-boundary 16.

Figure 4:
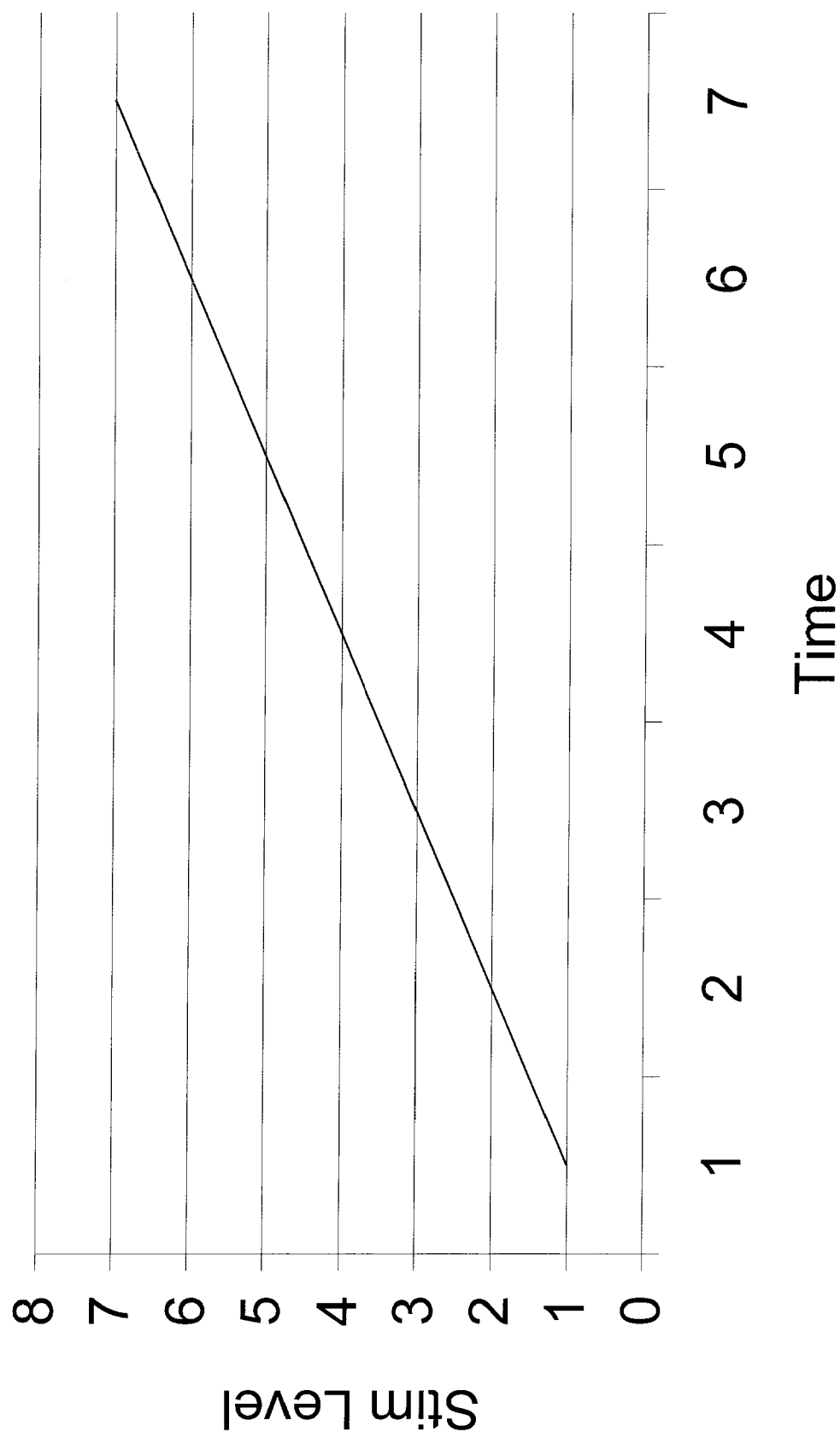
FIG. 4 illustrates a continuous stimulation level that may be utilized in another embodiment of the method of the present invention that is applied to the animal of FIG. 1.

Now, additionally referring to FIG. 4, there is illustrated a continuous stimulation level increase, thereby indicating that the stimulation level may vary in an analog fashion rather than in a digital fashion as illustrated in FIGS. 2 and 3.

Figure 5:
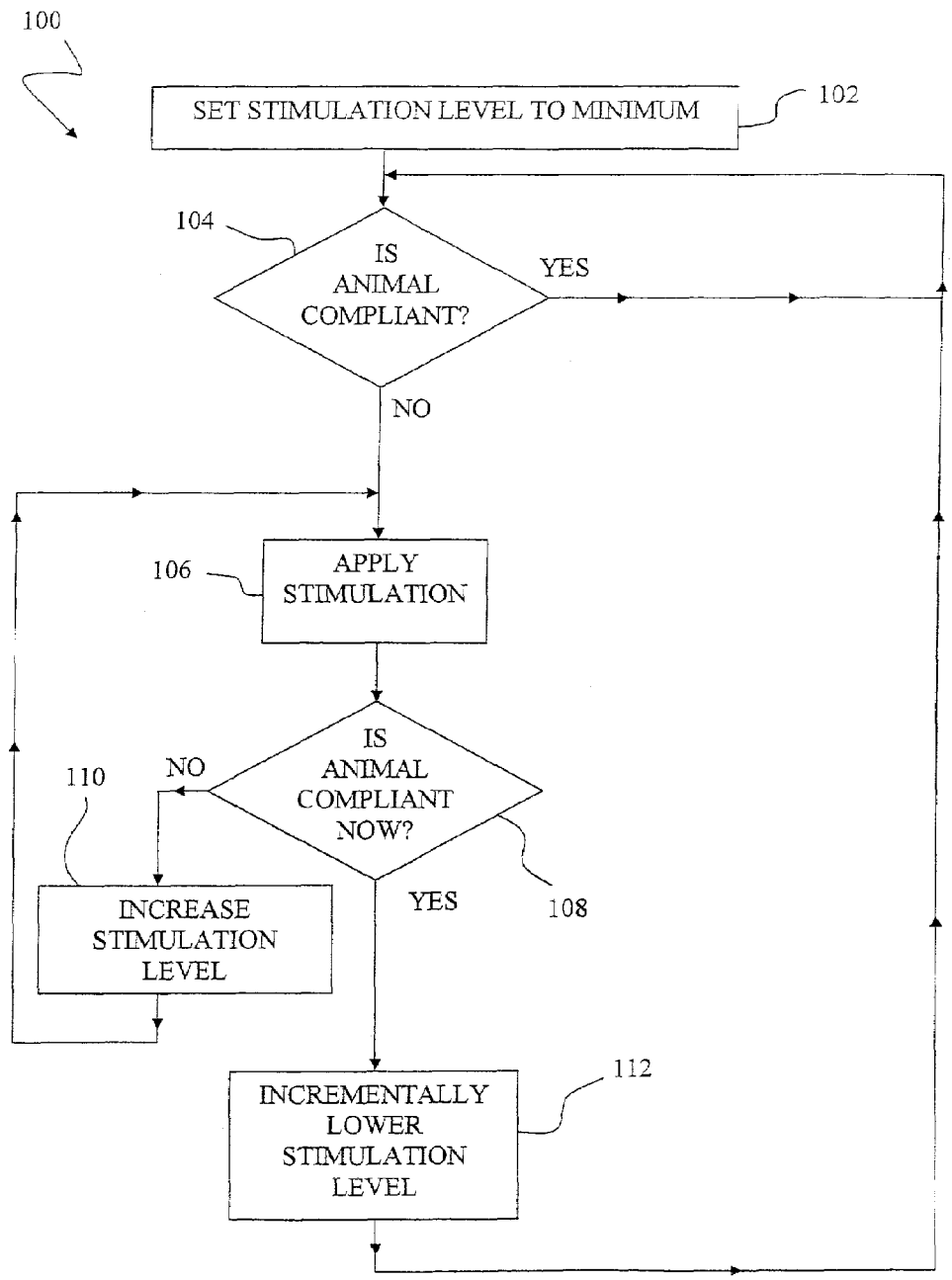
FIG. 5 is a block diagram illustrating the method of the present invention utilized by the apparatus of FIG. 1 and associated with FIGS. 2-4.

Now, additionally referring to FIG. 5, there is shown an embodiment of the present method of rising stimulation 100 in block diagram form. Upon initiation of method 100, the current stimulation level is set to a minimum value at step 102. The current stimulation level can be reset to an initial minimum value at step 102 by a triggering event, such as when a battery in receiving collar 14 is replaced, when the battery is recharged or by a manual reset by way of a mechanical or magnetically activated switch in collar 14.

At step 104, method 100 determines whether animal 12 is compliant. Compliance is determined by either the non-detection of a violation of a set boundary, such as inner-boundary 16 as illustrated in FIG. 1, in another automatic manner or by observation of a trainer. If the animal is not compliant, method 100 proceeds to step 106, otherwise method 100 returns to step 104.

If at step 104 it was determined that the animal is not compliant, then stimulation is applied at step 106. The stimulation that is applied is based upon the current stimulation level as illustrated in FIG. 3. The stimulation may be at a minimum level if animal 12 has become non-compliant for the first time since the initiation of the system or if the stimulation level is lowered by action of method 100.

The stimulation level is set one level less than that utilized to obtain conformance in the prior non-conformal act of animal 12. The applied stimulation may be applied in packets such as in FIG. 2 where the applied stimulation is turned on and then off, then if animal 12 remains non-compliant the stimulation is turned back on at level 2 and so forth as it stair-steps up to a level at which animal 12 becomes compliant, such as level 7, in this example. Alternatively, the applied stimulation is applied continuously during non-compliant behavior.

At step 108, animal 12 is again checked for compliance. If animal 12 is not compliant, method 100 proceeds to step 110 where the current stimulation level is increased as illustrated in FIG. 2, 3 and/or 4. With the stimulation level increased, method 100 returns to step 106 where the stimulation is again applied to animal 12, but at the increased stimulation level. If, at step 108 animal 12 is now determined to be compliant, then method 100 proceeds to step 112.

At step 112, method 100 lowers the stimulation level by an increment as illustrated at time period 8 of FIG. 3. The stimulation level is lowered only one increment in order to receive more immediate response from animal 12 in the event of a repeated non-compliant behavior. By reducing the stimulation level by one increment, it is likely that animal 12 will respond more quickly to this initial level of stimulation, thereby obviating the need to apply ineffective stimulation over several time periods. Once the stimulation level is lowered by an increment at step 112, method 100 returns to step 104.

Alternatively, the stimulation levels may be decreased by more than one step, but not immediately to the minimal level, thereby preserving an effective stimulation level for a more immediate response from animal 12. This approach advantageously reduces power consumption by the receiver collar 14 by obtaining quicker response from animal 12 to the stimulation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal behavior modification apparatus, comprising:
   a stimulation device configured for applying a stimulation having a current stimulation level associated with one of a plurality of stimulation levels including a minimum level, said stimulation device including control logic for applying a stimulation, based upon the steps of:
   increasing said current stimulation level;
   applying a stimulation corresponding to said current stimulation level;
   determining the behavior of the animal until compliant behavior is obtained; and
   reducing said current stimulation level to a level that is below said current stimulation level and above said minimum level dependant upon said determining step.

2. The apparatus of claim 1, further including the step of repeating said increasing step and said applying step dependent upon said determining step detecting noncompliant behavior of the animal.

3. The apparatus of claim 1, wherein said plurality of levels additionally include at least three levels.

4. The apparatus of claim 1, further comprising a collar, said stimulation device being an electrical stimulation device attached to said collar.

5. The apparatus of claim 1, wherein said reducing step includes lowering said stimulation level by one level of said plurality of levels.

6. The apparatus of claim 1, wherein said increasing step includes raising said stimulation level by one level of said plurality of levels.

7. The apparatus of claim 1, wherein said determining step includes receiving one of a signal that a border has been violated by the animal and a signal that the animal has barked.

8. The apparatus of claim 1, further including the step of reducing said current stimulation level to said minimum level after the passage of a predetermined amount of time.

9. An animal behavior modification apparatus, comprising:

a stimulation device configured for applying a stimulation having a current stimulation level associated with one of a plurality of stimulation levels including a minimum level, said stimulation device including control logic for applying a stimulation, based upon the steps of:

increasing said current stimulation level;

applying a stimulation corresponding to said current stimulation level;

determining the behavior of the animal until compliant behavior is obtained;

reducing said current stimulation level between said current stimulation level and said minimum level dependant upon said determining step; and setting said current stimulation level to a minimum level dependent upon a triggering event.

10. The apparatus of claim 9, wherein said triggering event is one of changing a battery in a collar, recharging said battery in said collar and manually activating a switch in said collar.

11. The apparatus of claim 10, wherein said triggering event is changing said battery in a collar.

12. The apparatus of claim 10, wherein said triggering event is charging said battery in said collar.

13. The apparatus of claim 10, wherein said triggering event is manually activating a switch in said collar.

* * * * *